United States Patent
Brady et al.

[15] 3,702,563
[45] Nov. 14, 1972

[54] ON-LINE SIMULATED IMPACT TESTER FOR GLASS CONTAINERS

[72] Inventors: Dale J. Brady; George W. Gerken, both of Lancaster, Ohio

[73] Assignee: Anchor Hocking Corporation, Lancaster, Ohio

[22] Filed: Jan. 22, 1971

[21] Appl. No.: 108,786

[52] U.S. Cl. ................................... 73/12, 73/94
[51] Int. Cl. ................................... G01n 3/10
[58] Field of Search ......... 73/12, 94; 101/38 R, 38 B, 101/39, 40

[56] References Cited

UNITED STATES PATENTS

| | | | |
|---|---|---|---|
| 988,556 | 4/1911 | Egerton | 101/40 |
| 3,294,016 | 12/1966 | Kessler et al. | 101/40 |

*Primary Examiner*—Jerry W. Myracle
*Attorney*—Wood, Herron & Evans

[57] ABSTRACT

An on-line squeeze tester for glass containers, having a fast cycle or response time. A force applying shoe is carried by a pivoted lever or bell crank. A pneumatic cushion acts on an arm of the bell crank to bias the shoe toward a drive wheel which rolls a single container across the shoe as squeezing force is applied to the container. The test head is cantilevered from an adjustable support stand.

13 Claims, 6 Drawing Figures

PATENTED NOV 14 1972

INVENTORS
Dale J. Brady
George W. Lerken
BY Wood, Herron & Evans
ATTORNEYS

ON-LINE SIMULATED IMPACT TESTER FOR GLASS CONTAINERS

This invention relates to apparatus for testing the strength of a glass container by applying a squeezing force to the container while it is being rolled between opposed surfaces. The invention is specifically directed to test apparatus for on-line use, that is, continuous and automatic use in which each container moving on a conveyor belt may be squeeze tested.

With the widespread use of no-return glass containers, much attention is being directed to testing the strength of such containers. The strength of a given container is largely dependent upon its shape and design, but even for containers produced in the same mold and from the same composition, there can be fairly wide individual or bottle-to-bottle variations. These can result from minute flaws or inhomogeneities such as seeds, chord, checks and so on. These can be so small as to pass unnoticed even in a careful visual inspection. They can, however, act as focal points for breaking of the container when impacted.

One technique for identifying the presence of such imperfections is to subject the containers to a "squeeze test," sometimes called a simulated impact test. In this test the container is rolled while under sidewise compressing or squeezing force, between two surfaces biased toward each other. The squeezing and rolling action subjects the surface of the container to forces which, although they do not correspond identically to forces involved in actual use, simulate for test purposes the impact forces incidental to use. Depending on the magnitude of the force applied, a given container will break or not break when it is given the squeeze test; in use the test is carried out by establishing a level of squeezing force at which substandard containers will break, but at which satisfactory containers will not break.

The squeeze testing of containers is known per se. One apparatus is shown in the copending application of Roger D. Dubble, Ser. No. 866,183, filed Oct. 14, 1969, now U.S. Pat. No. 3,618,370. In general, past squeeze testers have been limited to a relatively slow testing rate, in terms of containers (bottles or jars) tested per unit time. The device shown in the Dubble application, for example, operates on a batch basis in which each container is placed on a test stand and rotated about its axis while being squeezed. Individual handling is required to place each container on the test stand and to remove it.

For checking each container produced—which is desirable because of the random nature of imperfections of the types concerned—high speed test facilities are essential. A need for on-line test equipment is also presented, so that containers can be tested as they travel on the conveyor line, without separate palletizing or handling.

Present day glass container producing machinery is capable of production at an extremely high rate. It is commonplace for triple gob IS machines to produce at a rate of 160-220 or more containers per minute. Accordingly, for use with a container line operating at these rates, the squeeze tester ought to be capable of accommodating such throughputs. It is an important advantage of this tester that it is capable of such high levels of operation.

Moreover, this apparatus can be used for on-line testing. It is self-contained and can be readily moved about a manufacturing plant and integrated directly into an existing container conveyor line without the necessity of special or additional article handling or transfer equipment, and in fact carries out the test without stopping or shunting the containers off the line. This enables squeeze tests to be made continuously on a given line, or periodically checked on several different container lines in the plant.

In squeeze testing, one sidewall of the container is pressed against container rolling or rotating means by a force applying pad or shoe which engages a generally opposite sidewall portion of the container. The rolling means in effect rolls the container across the shoe while the container is being squeezed between the shoe and the rolling means. The drive which has been used for this purpose typically comprises a large diameter motorized wheel having a polyurethane tire around its circumference. The container is delivered by the conveyor to the nip or entrance of the testing space between the container rolling means and the shoe. The rolling means thereupon seizes the container and rolls it across the shoe, while biasing means applies the squeezing force to the shoe. Rolling the container at least 180° causes every point on the surface thereof to be flexed by the squeezing force and thus tests the response of entire sidewall circumference.

The general combination of a container rolling tire and a shoe is known for use in squeeze testing. In the past, single or dual pneumatically operated pistons have been used as the biasing means, the shoe being mounted through clevis connections to the piston rods. However, test apparatus utilizing such structure has been limited in rate. Previous apparatus has not been able to handle more than about 140 containers per minute with one at a time under squeezing force, which is slower than desirable. This has tended to restrict the use of such equipment.

We have found that the limiting factors in previous equipment have been the relatively high inertia and slow rate of acceleration of the shoe and the biasing means, and the unduly slow response time or "cycle time" of the biasing pistons. By "cycling" is meant the movement of the shoe and biasing means when a container comes onto, rolls across, and goes off the shoe, and the shoe is restored to position for the next container. Apart from cycling in testing of containers which do not break, when breakage does occur the reaction force of the container against the squeezing force disappears, and this causes the shoe to "overtravel" or surge toward the driving wheel, under the action of the unopposed biasing force. A stop limits the overtravel, and the shoe is forced back by the next container entering the test area.

It is an advantage of this invention that the inertia and the response time of the biasing means and the shoe have been greatly reduced, such that the device is capable of operating at test speeds up to 240 containers a minute—about 70 percent faster—and potentially higher.

In accordance with this invention, the shoe is carried on a lever arm which is swingable in a vertical plane, i.e., about a horizontal axis. The weight of the lever and the shoe is supported by the pivot; in previous constructions the piston means has been loaded sidewise by the weight of the shoe.

In preferred embodiment the shoe is mounted on one leg or portion of a suspended, pivotable bell crank. The resilient biasing means comprises a pneumatic cushion or air pillow, which is disposed to act on a horizontally extending leg or portion of the bell crank. This mechanism has been found t0 display a surprisingly low moment of inertia and starting friction or "sticktion," and thereby to provide the high rate of response which is required for on-line testing.

In the continuous or on-line operation of a squeeze tester, removal of cullet resulting from breakage of substandard bottles can pose a problem. As a practical matter, cullet removal should be automatic and continuous. In the past, difficulties have arisen here. If a container breaks while it is on or above the conveyor belt, broken glass will drop onto the conveyor and ride along with "passing" containers. These chips must be removed at an end roll or transfer station, or by air jet, etc. Even if the container is shifted partially or totally off the conveyor for squeezing, it has been difficult to place a cullet removal belt or chute beneath or adjacent to the test area since the test apparatus itself has blocked that area. It is a distinct advantage of this invention that the container is shifted sideways or transversely off the conveyor during the test operation, and that a cullet chute or conveyor can be placed directly below the test area, such that if breakage results the resulting chips will drop directly into the cullet chute so that they can conveniently be carried away automatically. This freedom of access for cullet removal is provided by a cantilever or overhanging mount for the test apparatus, such that the test head extends across the conveyor from above but not below, thereby leaving the space below unoccupied and clear for cullet removal. The containers are shifted or rolled sidewise by the squeeze wheel, and are squeezed while moving along an arcuate path that is offset or spaced over from the belt itself.

In preferred form the test apparatus is cantilevered from a vertical post on a movable stand. The head may be adjustably elevatable in the vertical direction to accommodate different conveyor heights, and/or different test areas on containers. The post is positioned against one side only of the conveyor line, and the test head itself overhangs the conveyor, extending entirely across it. The drive wheel has a diameter several times that of the articles being tested, and is driven by an adjustable speed motor to provide an optimum rate of container travel in test, as described subsequently.

The shoe presents a curved arcuate surface having as its approximate center the center of rotation of the container rolling means. Thus a generally uniform width annular segment or test space is defined between the wheel and the shoe. This space is offset from the conveyor belt, so that cullet will not fall on the belt. Guides or fences lead the containers from linear travel on the belt into the nip of this arcuate space, across which they then travel in epicyclic motion, and from which they are returned to the belt.

The bell crank from which the shoe hangs is carried on a transversely positionable carriage. By adjustment of this carriage toward or away from the tire, the width of the test space can be changed to accommodate different container diameters. Means are provided for adjusting and measuring the pressure of the air in the pneumatic pillow to provide different squeezing forces as desired. A cover plate overlies the open mouths of containers in or adjacent to the test area, so that chips from breakage of a container will be prevented from dropping into an adjacent container.

For the most meaningful and consistent results, it is important that the squeezing force be uniform and stable during the entirety of the test of a given container, and from one container to another. That is, the squeeze should not change appreciably as the container rolls across the shoe, else one portion of a container would be subjected to an undesirably lower or higher test force than other portions. If this occurs there is no assurance that every point on the container is capable of withstanding the higher force. This has been a difficulty in the past where multiple piston biasing means have been used and where more than one container have been loaded on the shoe at the same time. For example, past squeeze testers have sometimes been operated in such manner that at some moments a single container is being squeezed, while at other moments two containers are squeezed. Since the total squeezing force remains essentially constant for a given piston pressure, the loading when a single container is squeezed is then about twice that on each container where two are on the shoe at the same time. This leads to inaccurate testing.

Even where containers have previously been tested one-at-a-time only, variable loading occurs where two pistons, one at each end, are used to guide and bias the shoe. When a container just comes onto the shoe, the force of only a single piston acts on it. However, as it moves into the center of the shoe, the force of both pistons acts, and the loading is increased. Then as the container approaches the downstream end of the shoe, it is acted upon only by a single piston, at lesser load than in the middle. A container imperfection not capable of bearing the heavier force acting at the center of such a machine can nonetheless ostensibly pass the test if the flaw happens to be oriented so that it is tested at the entrance to or the exit from the test area. It is an advantage of the present apparatus that it insures only a single container will be exposed to the squeezing force at any time, and that the squeezing force will remain constant across the entire traverse of that container across the shoe.

The invention can best be further described by reference to the accompanying drawings, in which.

Figure 1:
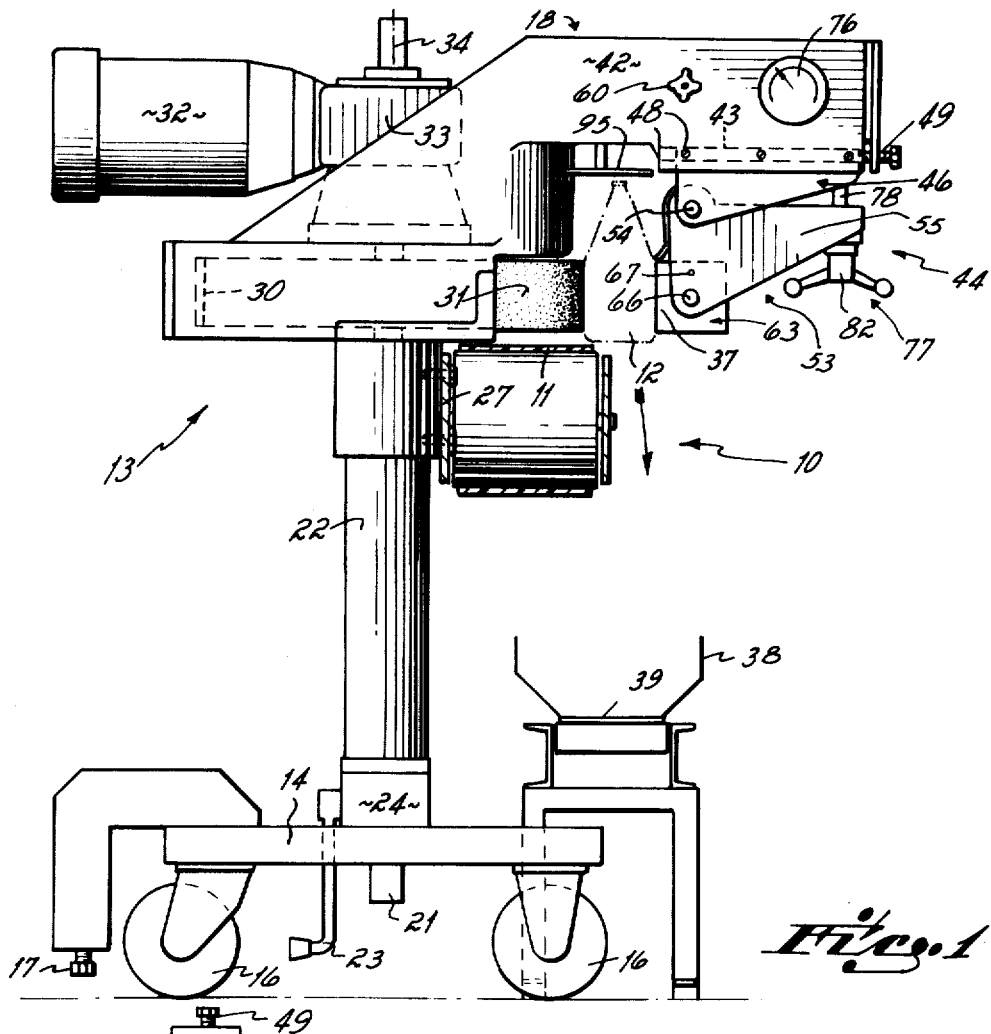
FIG. 1 is an end elevation of a preferred form of on-line simulated impact tester in accordance with the invention, showing the unit in testing operation at a glass container conveyor.

For purposes of specific explanation, the squeeze testing apparatus is shown installed on a single line glass container conveyor line 10. The conveyor 10 may be entirely conventional, and may comprise an existing conveyor line in a container manufacturing plant. The containers travel in single line relation (see FIG. 2) on a horizontal moving conveyor belt 11. Individual containers comprising no return carbonated beverage bottles are designated at 12. It is assumed that the direction of conveyor travel is in the direction indicated by the arrow in FIG. 2, that is, from left to right, although as will be shown the test apparatus is suitable for use with an opposite direction of container travel as well.

The testing unit generally designated by 13 includes a base or stand 14 which rides on swivelable rollers or casters 16, by which the entire unit 13 can be moved for installation or relocating as desired. Adjustable floor jacks 17 are provided for leveling if necessary or lifting the casters 16 off the floor, once the unit has been positioned.

The test mechanism per se resides in a testing head 18 which is supported on a vertically adjustable support or column 21 that slides within a housing or surrounding sleeve 22. Column 21 can be shifted vertically by an elevating crank 23 connected to it through a gear mechanism not shown, designated generally at 24. Housing 22 is secured, as by bolting at 27, to the frame of conveyor 10, to prevent walking or drifting in use.

The testing head includes container rolling or drive means in the form of a rotatable wheel 30 which preferably mounts a polyurethane tire 31 around its periphery for engaging the surface of the container 12. Wheel 30 is rotatable about an axis 34 coaxial with shaft 21, and for use in testing containers having diameters in the range of about 1 to 4 ½ inches, tire 31 typically has a diameter of about 22 inches. Wheel 30 is driven by a reversible and variable speed motor drive 32 through a speed reduction unit 33. Drive 32 should be capable of providing tire periphery speeds in the range of 620 to 3,100 inches per minute for testing containers in the diameter range mentioned.

Figure 2:
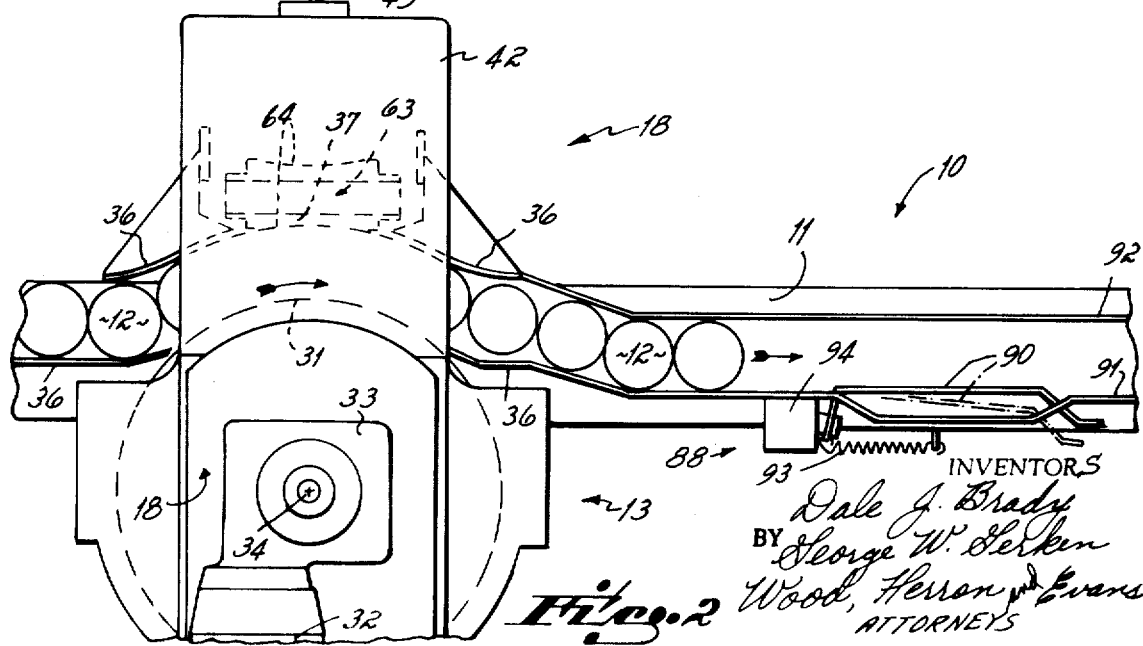
FIG. 2 is a top plan, partly broken away, of the apparatus shown in FIG. 1, and particularly illustrates the path of container travel through the test area.

In FIGS. 1 and 2 it will be seen that the axis of rotation 34 of wheel 30 stands to the side of conveyor belt 11. Thus containers 12 traveling on belt 11 engage tire 31 obliquely rather than diametrically. The containers are directed by a fixed guide or fence 36 to engage the periphery of tire 31 about three-fourth of the distance between axis 34 to the end of a radial line extending perpendicularly toward belt 11. Wheel 30 is driven clockwise in FIG. 2, and it displaces or shifts the container laterally or transversely across belt 11, so that during its traverse across the shoe or pad 37 the container is almost entirely offset from the conveyor, essentially supported only by the wheel and shoe at its opposite sides (see FIG. 1). If container breakage occurs, the cullet drops from the test area, as indicated by the arrow in FIG. 1, virtually unobstructed by conveyor 10 or the test apparatus, downwardly into a cullet bin or chute indicated generally at 38 which may deliver it to a cullet conveyor 39.

The shoe 37 and associated positioning mechanism are supported above housing 22 in cantilever fashion by a frame and housing 42. This frame 42 overhangs the conveyor 10, and extends entirely across it and beyond to the side thereof opposite that to which the testing unit is bolted at 27. Frame 42 provides spaced parallel horizontal ways or guides 43, 43 (see FIGS. 3 and 4). These guides receive and support shoe mounting means, generally at 44, for movement of the latter toward and away from wheel 30. The shoe mounting means 44 include a carriage or slide 46 and a bell crank 53. Carriage 46 has side flanges which are supported for sliding movement in the ways 43, 43, and a downwardly depending rib 47 from which bell crank 53 hangs suspended. The crank 53 is journaled on trunnions for rotation about a horizontal axis 54. The ways 43 are provided with a series of locking bolts or clamps 48 in each side thereof, and an end stop 49 in frame 42 can be adjusted to bear against the end of carriage 46, to limit transverse displacement of the carriage with respect to wheel axis 34.

Bell crank or shoe support lever 53 is generally triangular and is supported on trunnions or pivots at its elbow for swinging movement about them. The trunnion axis 54 is parallel to the overall line of container travel on belt 11. Specifically, rib 47 of the carriage is bored at opposite vertical side edges thereof to receive threaded pivot pins 56, 56 which receive and carry roller bearings 57 in bell crank 53.

Bell crank 53 has two similar, spaced sides 55, 55 each of which includes a downwardly extending portion or leg 58 and a rearwardly or outwardly extending portion or leg 59. The opposite sides 55 are cross-connected and reinforced by internal webs or rib structure indicated at 61.

Shoe 37 is carried between the sidewalls 55, 55 of the bell crank, specifically between legs 58 thereof, and preferably comprises a double sided or reversible member 63 having separate concave wear surfaces 64, 64 on opposite sides. The reversible member 63 is pivoted on bearings 66, 66, and supported by shoulder bolt 95,95. The member 63 is swingable through a small angle to accommodate such tilting forces as may act thereon due to angulations of container surface as the container moves past. A detent 67 in each bell crank side 55, 55 positions a given surface 64 in position for engaging a container. When one surface 64 is worn after prolonged usage, the second surface 64 may be positioned for use by rotating the member 63 180° about the bearings 66, 66. A new wear surface can then be provided with only very minor interruption of testing.

The wear surface 64 is preferably formed of a polyurethane and has a steel backing or insert, and is bolted as it ends to the member 63. Each surface 64 is concave (see FIGS. 2 and 6), having the axis 34 as its approximate center of curvature (this is not highly critical since the entire shoe support means is movable on the ways 43 toward and away from axis 34). The arc length of the surface 64 should correspond to (or slightly exceed) one-half the circumference of the containers to be tested. For testing a variety of bottles having diameters in the overall range of 1 to 4 ½ inches, three different sizes of shoes 64 ought to be provided, one having, for example, an arc length of about 4 ¼ inches, the second having and arc length of 5 ⅞ inches, and the third having an arc length of 7 inches, for use with bottles in the 1 to 2 ¾, 2 ¾ to 3 ¾ and 3 ¾ to 4 ½ inch diameter ranges, respectively.

Figure 3:
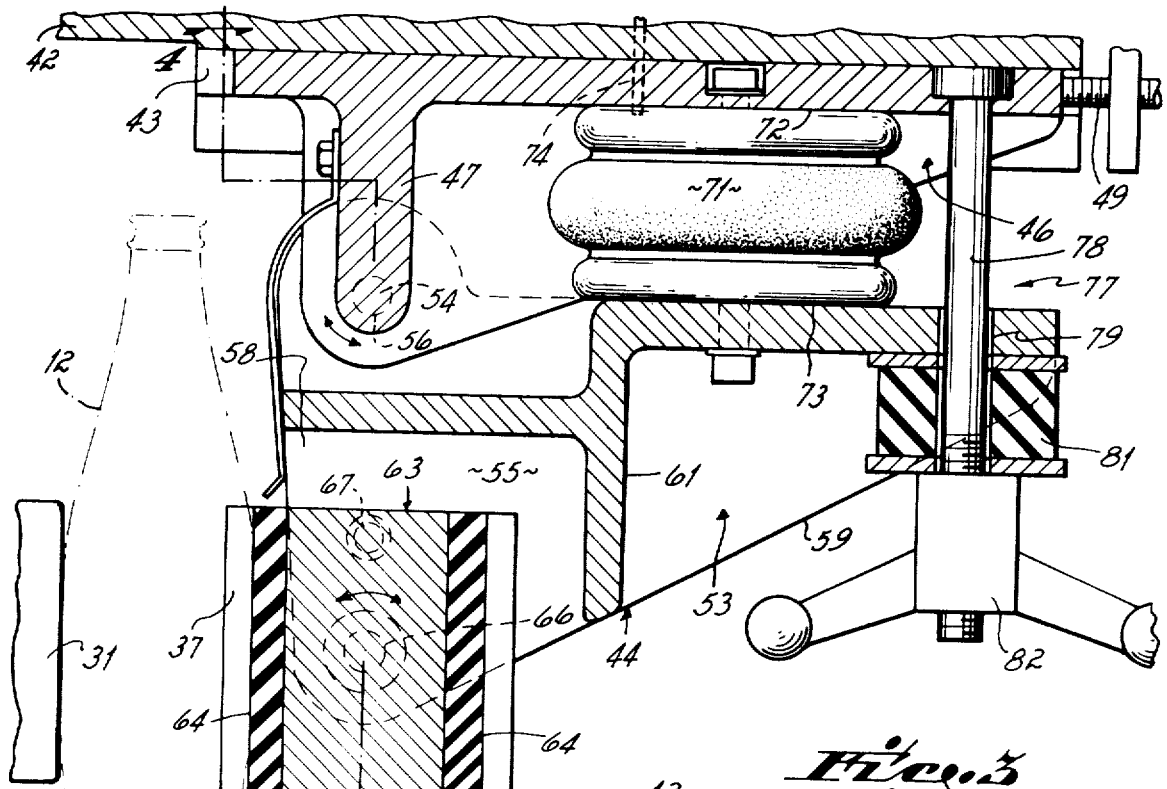
FIG. 3 is an enlarged vertical section, partly broken away, showing details of the shoe, pneumatic cushion, and bell crank mount.
Figure 4:
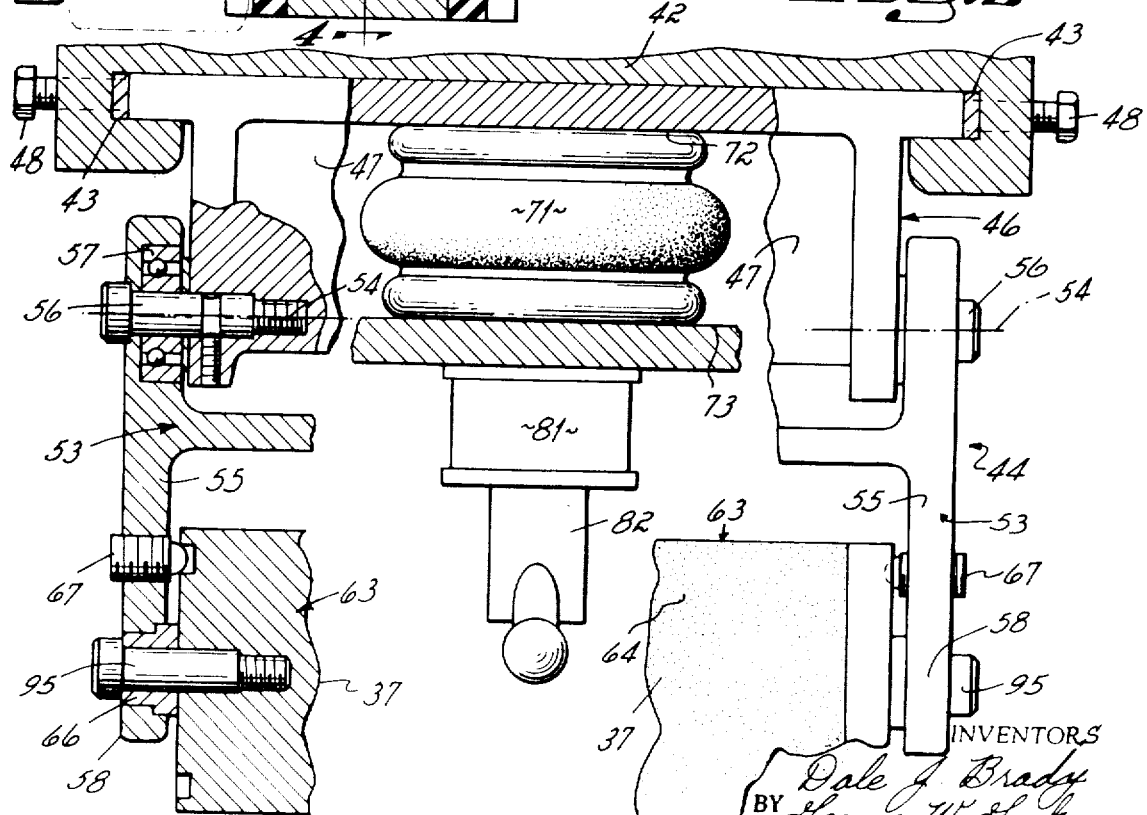
FIG. 4 is a vertical section taken on line 4—4 of FIG. 3.

In FIG. 3 of the drawings it can be seen that both the bell crank 53 and the shoe 37 hang suspended from pivot 54. The crank 53 is biased about pivot 54 in a direction to carry shoe 37 toward the tire 31, so that the container 12 is compressed between the tire and shoe. The biasing force is applied to bell crank 53 by an air cushion 71 or pneumatic pillow. The cushion 71 is mounted and compressed between an overhead horizontal surface 72 of the carriage 46 and generally horizontally extending web or rib 73 of the rearward leg 59 of bell crank 53. The downward thrust of air cushion 71 on rib 73 is transformed by the bell crank into a generally horizontally directed force on shoe 37. The amount of this thrust is substantially constant over the range of cushion and shoe movement involved in a given test and for a given pressure of air in the air cushion 71, but it varies with the air pressure. In order to provide a range of different forces which can be applied, as warranted for the testing of containers of different sizes and shapes, the air pressure in cushion 71 is adjustable through a pressure regulator knob 60 in an inlet line 74 supplied by a conventional source of pressure air, not shown. The pressure in line 74 (and hence, cushion air pressure) is indicated on a pressure gauge 76 (see FIG. 1) on the housing 42. The read-out of this dial may be in psi, or it may be translated (by a constant multiplier, depending on parameters) into pounds of force on the container.

Actual tests have demonstrated must quicker response or cycle time of this mechanism in comparison to the air pistons previously used. This is evident as an increase in operating rate from a previous limit of about 140 containers per minute, to a rate of 240 per minute with the new apparatus, for containers of the same type.

If a container should break, the righwardly directed (as seen in FIG. 3) container reaction force on shoe 37 disappears, and the biasing force of the air cushion will cause the bell crank and shoe to tend to swing sharply clockwise or to the left and overtravel beyond the proper position for engagement of the next following container. The amount of overtravel is cushioned and limited by a shock absorber generally indicated at 77 as shown in FIG. 3. This includes a bolt 78 which extends downwardly from surface 72 of the carriage 46, through an aperture 79 in bell crank web 73. A resilient cushioning block or rubber spring 81 is supported and positioned on bolt 78 below web 73, by an adjusting hand screw 82. This limits the clockwise rotation of bell crank about pivot 54. This mechanism cushions overtravel; moreover, whether or not there is breakage, the block 81 causes shoe 37 to be properly repositioned to engage the next following container.

Figure 5:
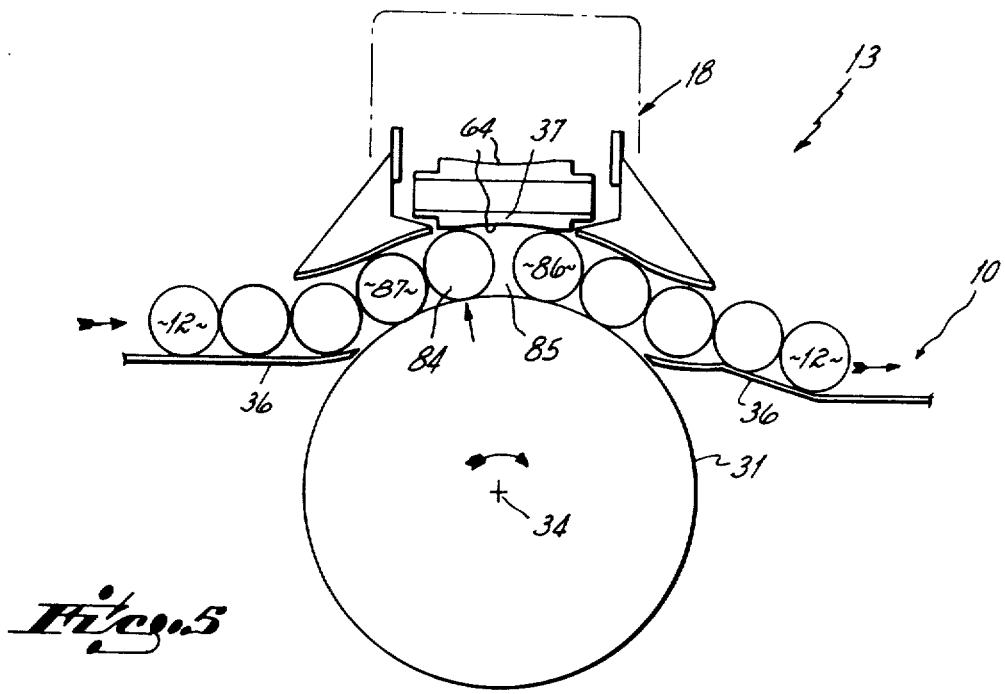
FIG. 5 is a diagrammatic top view illustrating the spacing relation of the containers as one container is just positioned to move onto the shoe as another container moves off of it.
Figure 6:
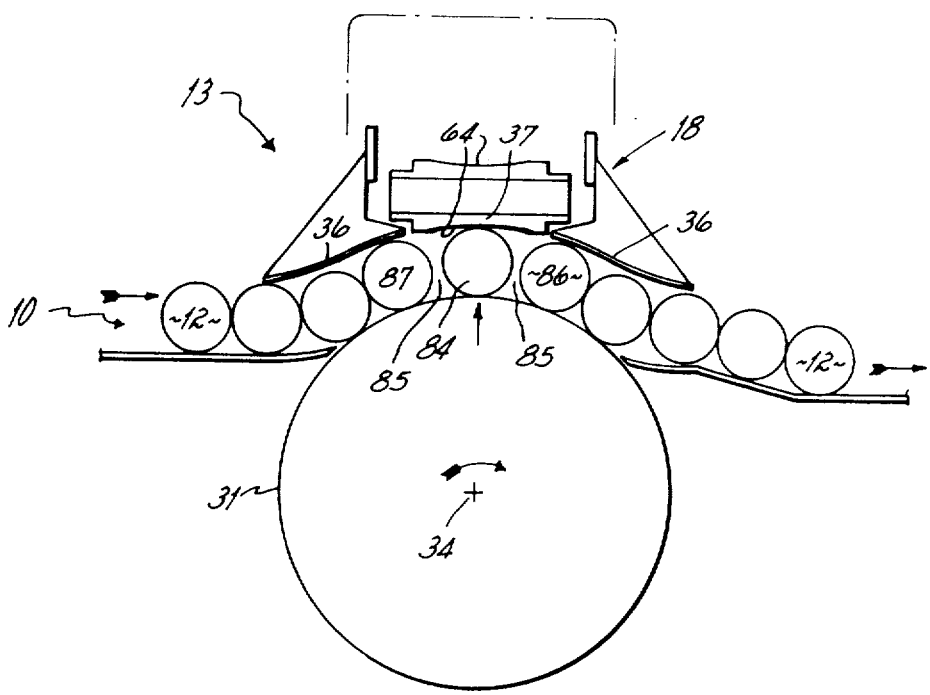
FIG. 6 is a diagrammatic view similar to FIG. 5 but shows a container at the mid point of its traverse of the shoe.

It is an important advantage of the invention that the testing mechanism requires no separate container spacing or spreading means. Even though incoming containers may be back-to-back on belt 11, as shown in FIGS. 2, 5 and 6, the test apparatus nonetheless spaces them during test and insures that only one container is subjected to squeezing force at a given time, and insures that the force on that container remains constant across the pad. This is achieved by the relation of the wheel speed to container diameter, test space arc length, and conveyor speed.

For maximum throughput or test rate, the wheel periphery speed should approximately be equal to the container circumference times the number of containers per minute moving on the conveyor line. The machine is capable of accepting and responding to containers at this rate, at least up to about 240 per minute; moreover, if this relation is observed, each container is fully tested around its circumference, but no more, and the container is moved entirely across the test space before the next following container can move up to the entrance to the test space, even if the containers are back-to-back (the most severe condition) on the conveyor.

This may be illustrated by reference to a specific example in which containers of a nominal 2 ¾ inch diameter are incoming on the conveyor line in edge to edge contact with one another, at a line rate of 240 per minute. The tire 31, having a diameter of 22 inches, is rotating at a periphery speed of 2080 inches per minute. The radius of curvature of the shoe surface 64 is about 13 ¾ inches and the length of the arcuate surface 64 is approximately half the container circumference, or 4.3 inches. As shown in FIG. 5, one container 84 is just about to enter the nip or entrance of the testing space 85 between the wheel and the shoe surface 64, at the moment the preceeding container 86 is leaving the exit area at the other end of space 85. Up to and at this moment container 84 is not under the control of tire 31, and its speed is the speed of the conveyor. When container 84 is gripped between tire 31 and shoe surface 64 it is quickly accelerated, and it is carried entirely across shoe surface 64 in the same period of time that is takes the next following container 87 to reach the entrance to squeeze space 85, i.e., the point occupied by container 84 in FIG. 5. Thus container 84 is moved across the shoe before the next container comes into position to be moved onto the shoe. The spacing between the containers is thus increased in the test area 85 (see FIG. 6), but is restored to the original spacing on the downstream side of it.

In the event of a blockage or a work stoppage downstream, containers will tend to stack up on belt 11 to the right of test head 18 in FIG. 2. It is desirable in these circumstances to provide for shut-down of the test assembly; otherwise the wheel 30 would forceably eject bottles into an already stacked or jammed condition, and possibly cause breakage. For this purpose jam sensing means 88 are provided to stop the wheel (FIG. 2). The jam is detected by sidewise pressure exerted by the stacked-up containers on a pivotable fence or microswitch arm 90. This fence 90 is biased counter-clockwise by spring 93, toward the solid line position shown. When arm 90 is swung outwardly to the dotted line position, due to an accumulation of articles confined between the opposed guides 91 and 92, it actuates a microswitch 94 which deenergizes motor 32, so that testing ceases until the accumulation is removed.

In the event a container break occurs, the chips fall into the cullet bin 38 without substantial accumulation on the conveyor belt 11. The overhanging cover plate 95 (see FIG. 1) screens the area above the container undergoing test and the area over preceeding and following containers, and thus prevents flying chips from falling into adjacent containers. Breakage of a container does not necessitate shut-down or delay of the line, because the air pillow 71 cycles quickly and the next following container can be tested without interruption.

From the forgoing it can be seen that my means of this invention virtually every single article produced on a given container line can be tested while on the take-off conveyor. Imperfect articles are automatically removed by breakage, and the cullet can readily be segregated and removed. The test entails virtually no line delay, since the articles move through the test system in the course of their standard rate passage along the conveyor line. The mechanism is readily adjustable for articles of different sizes, and because of its cantilever construction can easily be moved from line to line and quickly attached, as desired.

It can also be seen in FIG. 2 that, except for the jam detector 88, the test apparatus is symmetrical on each side of axis 34. This renders it suitable for use with the reverse direction of line travel from that shown; the direction of rotation of motor 32 is simply switched to the reverse. The mechanism 88, if used, is relocated for such reversal, since it operates on the downstream side.

Having described the invention, what is claimed is:

1. Apparatus for testing the strength of glass container comprising,
   a shoe having a surface across which a container can be rolled,
   a pivot,
   a shoe support lever mounted for swinging movement about said pivot, said shoe mounted to said shoe support lever,
   said pivot supporting the full weight of both said lever and said shoe,
   container rolling means spaced from and opposite to the surface of said shoe for engaging a container at an entrance to the space between the surface of said shoe and said rolling means, and rolling said container across said surface to an exit from said space, and
   resilient biasing means acting to turn said lever about said pivot in a direction urging said shoe toward said rolling means and thereby squeeze a container between said shoe and said rolling means, said biasing means being free of the weight of the lever and shoe, and thereby displaying a faster response time than if the said weight were carried by the biasing means.

2. The apparatus of claim 1 wherein said pivot is horizontal and said lever hangs from and is suspended by said pivot.

3. The apparatus of claim 1 further including a conveyor line, said apparatus being mounted to a stand which is fastened to said conveyor line at one side thereof, said lever and shoe extending in horizontal cantilever fashion from said stand above and across said conveyor line to an opposite side thereof so that the area beneath said lever and shoe is accessible for cullet removal.

4. The apparatus of claim 3 wherein said apparatus is symmetrical and accommodates either direction of line movement.

5. The apparatus of claim 1 further including a carriage, said pivot being provided in said carriage, said carriage being adjustably positionable with respect to said rolling means to change the spacing of the shoe from the rolling means.

6. Apparatus for testing the strength of glass containers comprising,
   a shoe having a surface across which a container can be rolled,
   a horizontal pivot,
   a shoe support lever mounted for swinging movement about said pivot, said lever being a bell crank hanging from and suspended by said pivot at the elbow of said bell crank,
   said shoe mounted to said shoe support lever,
   said pivot supporting both said lever and said shoe,
   container rolling means spaced from and opposite to the surface of said shoe for engaging a container at an entrance to the space between the surface of said shoe and said rolling means, and rolling said container across said surface to an exit from said space, and
   resilient biasing means acting to turn said lever about said pivot in a direction urging said shoe toward said rolling means and thereby squeeze a container between said shoe and said rolling means.

7. The apparatus of claim 6 wherein said shoe is mounted to said bell crank directly below said pivot.

8. The apparatus of claim 7 wherein said biasing means acts on a portion of said bell crank which extends approximately right angularly with respect to a line between said pivot and said shoe.

9. Apparatus for testing the strength of glass containers comprising,
   a shoe having a surface across which a container can be rolled,
   a pivot,
   a shoe support lever mounted for swing movement about said pivot, said shoe mounted to said shoe support lever,
   said pivot supporting both said lever and said shoe,
   container rolling means spaced from and opposite to the surface of said shoe for engaging a container at an entrance to the space between the surface of said shoe and said rolling means, and rolling said container across said surface to an exit from said space, and
   a pneumatic cushion acting to turn said lever about said pivot in a direction urging said shoe toward said rolling means and thereby squeeze a container between said shoe and said rolling means.

10. The apparatus of claim 9 wherein a resilient stop limits movement of said lever about said pivot in the direction toward said rolling means.

11. Apparatus for testing the strength of glass containers comprising,
    a shoe having an arcuate surface across which a container can be rolled,
    a pivot,
    a shoe support lever mounted for swinging movement about said pivot, said shoe mounted to said shoe support lever,
    said pivot supporting both said lever and said shoe,
    container rolling means comprising a driven wheel spaced from and opposite to the surface of said shoe for engaging a container at an entrance to the space between the surface of said shoe and said wheel, and rolling said container across said surface to an exit from said space, the space between said surface and wheel being an annular segment of substantially uniform width between entrance and exit, and resilient biasing means acting to turn said lever about said pivot in a direction urging said shoe toward said wheel and thereby squeeze a container between said shoe and said wheel.

12. The apparatus of claim 11 wherein said wheel is driven at a speed approximately equal to the circumference of the container to be tested, times the number of containers to be handled per unit time.

13. Apparatus for testing the strength of glass containers comprising, a shoe having a surface across which a container can be rolled, a pivot, a shoe support lever mounted for swinging movement about said pivot, said shoe mounted to said shoe support lever, said pivot supporting both said lever and said shoe, container rolling means spaced from and opposite to the surface of said shoe for engaging a container at an entrance to the space between the surface of said shoe and said rolling means, and rolling said container across said surface to an exit from said space, and resilient biasing means acting to turn said lever about said pivot in a direction urging said shoe toward said rolling means and thereby squeeze a container between said shoe and said rolling means, said pivot provided in a carriage which is adjustably positionable with respect to said rolling means, said lever being a bell crank suspended below said carriage, said biasing means being a pneumatic cushion mounted to and between said carriage and bell crank.

* * * * *